United States Patent Office 3,563,916
Patented Feb. 16, 1971

3,563,916
CARBON BLACK-SYNTHETIC RESINS ELECTRO-CONDUCTIVE COMPOSITION
Naomitsu Takashina, Fujiwawa-shi, Wakio Nagashima, Hiratsuka-shi, and Michiaki Furuno, Yokohama, Japan, assignors to Japan Gas-Chemical Company, Inc., Tokyo, Japan
No Drawing. Filed Aug. 19, 1968, Ser. No. 753,761
Claims priority, application Japan, Aug. 23, 1967, 42/54,066
Int. Cl. C09c 1/44; H01b 1/06
U.S. Cl. 252—511      3 Claims

ABSTRACT OF THE DISCLOSURE

A carbon black-synthetic resins electroconductive composition which, when formed into, a heating element exhibits markedly little time variation of electrical resistivity and high durability to continuous use at high temperature, and the characteristics of the composition residing in that the composition is consisted of: a carbon black-polymer of $\alpha$, $\beta$-ethylenically unsaturated monomer composition of special type and a thermosetting aromatic polyamide resin.

---

This invention relates to a carbon black-synthetic resins electroconductive composition which, when formed into, for example, a heating element in the form of sheet or film by curing, as optionally carried on a suitable supporting substrate, can be used for a long period even at such high temperatures as of around 200° C., and furthermore exhibits markedly little time variation of electrical resistivity. The composition furthermore can exhibit excellent characteristics when utilized for the preparation of resistor film or heating sheet with resistivity values varying over a wide range, such as from a surface resistivity as low as $$10\Omega_\square$$

to as high as above $$10^6\Omega_\square, \text{ even } 10^{10}\Omega_\square$$

both the lower and higher limits above-mentioned being impossible to be supplied by conventional arts.

More particularly, the invention relates to an electroconductive composition which contains uniformly dispersed carbon black and at least two synthetic resins in a liquid medium, the characteristics of the composition residing in that the composition is consisted of:

(i) a carbon black-polymer of $\alpha$, $\beta$-ethylenically unsaturated monomer composition comprising carbon black and a polymer of at least one $\alpha,\beta$-ethylenically unsaturated monomer having an average molecular weight ranging from 500 to 50,000 and substantially decomposing at from 150° to 300° C., and at least 5% by weight of the polymer being chemically bonded with the carbon black particles, and (ii) a thermosetting aromatic polyamide resin (hereinafter is called polyamide resin) which is dissolved in a liquid medium, the said electroconductive composition consisting of 2–50% by weight of the carbon black-polymer of $\alpha,\beta$-ethylenically unsaturated monomer composition, and 50–98% by weight of the thermosetting aromatic polyamide resin solution, the said carbon black existing in amount of 5–95%, preferably 50–95% by weight in the said (i) composition and the non-volatile component existing in amount of 5–50%, preferably 10–40% by weight in the said electroconductive composition.

Electroconductive composition composed of dispersed carbon black and synthetic resins in liquid media are known.

However, articles manufactured from such known type of electroconductive composition, for example, heating sheet, cannot withstand continuous use for any practical length of time at high temperatures, for example, of around 200° C. Thus, it was impossible to provide the articles which can be used for a long period at temperatures above 100° C. Furthermore, when such articles are used at high temperatures, their electrical resistivity exhibits conspicuous time variation, and for this reason also the articles are deficient for practical use.

Also the obtainable resistivity range for such articles of one sort of composition is in the order of $$10^2 - 10^8 \Omega_\square$$

and articles having a constant resistivity in wide range beyond the said range, for example, $$10 - 10^{10} \Omega_\square$$

cannot be manufactured.

Also strictly uniform dispersion of carbon black is hardly achievable. Consequently the articles prepared from the conventional electroconductive composition exhibit locally non-uniform resistivity, or provision of articles of a desired resistivity with a little time variation and good qualitative reproducibility is difficult.

Again the preparation procedure itself of such composition is subject to severe limitations, due to which it is extremely difficult to provide an electroconductive composition sufficiently suited for the material of electroconductive coating or film in which the carbon black is dispersed with high uniformity and which has a predetermined, fixed electrical resistivity.

This known type of electroconductive composition is manufactured by mixing and dispersing carbon black in the resin by mechanical means. However, as the carbon black is mixed into the resin, the viscosity of the mixture abruptly arises, and extremely large shear and long time are required for satisfactory mixing. In some cases using the great amount of the carbon black to be mixed, the procedure becomes practically inoperable. This is one of the main causes to make provision of the articles with wide variety of resistivity difficult or impossible.

Furthermore, even if the carbon black particles could be once dispersed in the electroconductive composition in any means, they readily precipitate and are separated from the composition in a short term. This poor storage stability renders the advance preparation and storing of such composition difficult.

As a result of researches made with a view to overcoming these various difficulties and limitations, we have succeeded in providing electroconductive compositions which can be used at high temperatures for such a long time as unexpected in the conventional compositions, is excellent in an extremely reduced time variation of the electrical resistivity and hence overcomes the limitations conventionally involved in the art, by combining principles of two different techniques in the field of the fibers which belongs to a different genre from that of the field of the electroconductive compositions and which has different technical problems to solve from those of the field of the electroconductive compositions, and by applying said combined principles of two different techniques in the field of the fibers to the field of the electroconductive compositions.

Accordingly, the object of the invention is to provide an electroconductive composition having a high storage stability, which is well adapted for the preparation of heat resisting coating or film of carbon black-containing-electroconductive composition in which the dispersion of carbon black is highly uniform, the specific electrical resistivity of the coating or film being variable over a wide range including heretofore unobtainable values, furthermore with little time variation, and the foregoing characteristics being retained at high temperatures heretofore held as unpractical.

Another object of the invention is to provide the articles prepared with the use of above-described composition.

Still many other objects and advantages of the invention will become more apparent from reading the following descriptions.

It is obvious that resin component of excellent thermal stability should be utilized for the preparation of any electroconductive composition of high thermal resistance.

However, to mix a synthetic resin with carbon black encounters many technical difficulties because of the abrupt rise in viscosity of the mixture occurring during the mixing. Furthermore, attempts to use heat resisting, thermosetting resin with the aid of suitable dispersing agent such as surface active agent, solvent also failed, since the mechanical mixing of carbon black with such thermosetting resin is impossible without substantial reduction in the contents of the solid resin as well as of carbon black by using great amount of solvent. Thus the electrical resistivity of the resultant composition is severely limited. Furthermore the composition exhibits poor storage stability, and dispersibility of carbon black therein neither is essentially improved.

For example, when carbon black, a heat resisting, thermosetting resin (e.g., polyamide resin) and a solvent are subjected to mechanical mixing, the composition obtained essentially possesses the above-described deficiencies in addition to the difficult mixing due to the sharp increases in viscosity in the mixture. Furthermore, in some cases, even the electroconductive property itself of the composition is lost. Whereas, if the amount of carbon black is increased to avoid the qualitative drawbacks, the mixing is rendered too difficult to achieve uniform dispersion of carbon black. Furthermore, if the amount of solvent is increased to facilitate the mixing, the composition loses the electroconductivity because of the substantial lowering of the carbon black content. Thus the qualitative requirement and operability in this case are incompatible, presenting a serious technical problem.

Accordingly, we arrived at a concept of performing cure of heat resisting, thermosetting resin in the presence of carbon black, and experimented the cure reaction of polyamide resin while causing the concurrent presence of carbon black in the cure reaction system. However the carbon black was not uniformly dispersed in the system and easily separated by precipitation. Furthermore, the attempt to polymerize the monomers of heat resisting, thermosetting resin in the presence of carbon black, gave the unsatisfactory result as above described. Thus the experiments were fruitless.

Whereas, we discovered a surprising fact that the foregoing objects of the invention is advantageously achievable by utilizing the principles of two different techniques in fiber technology which have never been practiced or suggested in the field of electroconductive composition technology, and by skillfully combining them.

In the field of fiber technology, techniques comprising polymerizing monomer in the presence of carbon black pigment in order to avoid the objectionable agglomeration of the pigment which causes spinning difficulties and non-uniform coloring, and spinning the resultant polymer to produce very evenly colored filaments in which the pigment is uniformly dispersed are known.

To wit, preparation of carbon black-pigmented vinyl or vinylidene polymer composition in which the carbon black is very finely dispersed, by absorbing at least one vinyl or vinylidene monomer; such as vinyl acetate, acrylic and methacrylic acids and esters, and their derivatives such as acrylonitrile, methacrylonitrile and styrene; onto carbon black in the substantial absence of any resinous polymer, and subjecting the monomer to polymerization; and preparation of filaments from such composition, are known (British Pat. No. 859,292).

The same literature discloses that the resultant composition may be employed for the production of shaped articles which are carbon black-pigmented in the mass, for example, by extrusion of fine dispersions of these products alone or in mixture with other materials in liquids which are solvents both for the polymer and for such other materials, to form synthetic textiles. For example, the literature teaches that the carbon black-pigmented polyacrylonitrile composition obtained accordingly can be converted to an admixture with an uncolored polyacrylonitrile to serve as the material of filaments, or filaments may be formed from a similar admixture of the carbon black-pigmented polyvinyl acetate and a solution of cellulose acetate in acetone at convenient spinning concentration.

Separately, a process known as "matrix method" is practiced in the art of polyfluorocarbon filament preparation, as one of the spinning means of polyfluorocarbons, for example, polytetrafluoroethylene, which are soluble in very limited group of solvents compared with other thermoplastic resins and also have extraordinarily high melt viscosities. According to the matrix method, for example, solid polytetrafluoroethylene particles are suspended in water, and added with a minor quantity of matrix substance such as sodium alginate, cellulose viscose, and the like, to form a spinning solution. The solution is wet-spun as extruded from a nozzle into a coagulation bath, and the coagulated filaments are sintered at temperatures in the order of 360–400° C.

We discovered that the composition in which a polymer of $\alpha,\beta$-ethylenically unsaturated monomer obtained by the polymerization in the presence of carbon black, serving as the matrix, is combined with a thermosetting, aromatic polyamide resin, is useful for the purpose of the invention, since by heating the said composition at a temperature at which the polymer serving as the matrix will decompose and the polyamide resin will be converted to polyamide, polyimidazole or polyoxadiazole resin by curing, the carbon black which is present in the composition through the medium of the matrix polymer can be dispersed in the cured resin with high uniformity and at the desired concentration.

The above discovery is indeed surprising, when the aforementioned facts, i.e., that the objects of the invention cannot be achieved by polymerization of the monomers of heat resisting, thermosetting resin or cure of aromatic polyamide resin to polyimide, polyimidazole or polyoxadiazole resin having excellent heat stability in the concurrent presence of carbon black, and that the uniform dispersion of carbon black cannot be achieved by utilization of masterbatch system which is well known in the art of coloration blending of resins, are considered.

The process known as "matrix method" provides a technical concept of no more than using a matrix substance as a certain type of binder of polyfluorocarbon resin particles having high melt viscosity to form the resin into the desired filamentary form, and thereafter sintering the filaments to remove the no more necessary matrix substance therefrom as well as to fuse the polyfluorocarbon resin particles into single mass. Whereas, we discovered an entirely unexpected fact that upon curing the liquid composition of thermosetting, aromatic polyamide resin in electroconductive composition, in which polymer of $\alpha,\beta$-ethylenically unsaturated monomer of a carbon black-polymer of $\alpha,\beta$-ethylenically unsaturated monomer composition containing carbon black as very evenly dispersed in the said composition through the medium of the specific polymer later described, is used as the matrix, and after application, the matrix polymer is removed by thermal decomposition or depolymerization, not merely leaving the carbon black in the cured polyimide, polyimidazole or polyoxadiazole resin formed by the heating, but causing transfer of carbon black into the said polyimide, polyimidazole or polyoxadiazole resin while retaining the very evenly dispersed state thereof in the former carbon black-polymer of α,β-ethylenically unsaturated monomer composition.

The first component of the carbon black-containing electroconductive composition of the invention, i.e. the carbon black-polymer of α,β-ethylenically unsaturated monomer composition, comprises of a polymer of at least one α,β-ethylenically unsaturated monomer having an average molecular weight of 500–50,000 and substantially decomposing at 150–300° C., and carbon black, at least 5% by weight of the polymer being chemically bonded with the carbon black particles.

This carbon black-polymer of α,β-ethylenically unsaturated monomer composition can be prepared by contacting at least one α,β-ethylenically unsaturated monomer with a free radical polymerization initiator, in the presence of carbon black particles.

The carbon black-polymer of α,β-ethylenically unsaturated monomer composition which is one component of the composition of the invention is characterized in that generally it shows non-thixotropic Newtonian flow in an organic medium, or even when it shows thixotropy, it is by minor extent compared with the mechanical mixture of carbon black and shows low viscosity and high fluidity rather close to those of Newtonian flow, in spite of its high carbon black content.

The composition furthermore is characterized in that at least 5% by weight of the polymer of α,β-ethylenically unsaturated monomer therein is chemically bonded with the carbon black particles. Upon filtering through a layer of diatomaceous earth the resin liquid composition obtained by polymerizing the monomer in the presence of carbon black, optionally in a solvent, such as ethyleneglycol monomethyl ether, the composition is separated into free polymer and the polymer chemically bonded with the carbon black particles. (Incidentally, if the polymerization is performed in the absence of the solvent, the solvent is added to the polymerization product to form the resin liquid composition.) If those two polymers once separated by the filtration are mechanically re-mixed to obtain the identical composition having the same solid resin and carbon black contents as those of the original composition, the mixture exhibits conspicuous thixotropy and is no more useful as the component of the subject composition. Again, it is very difficult to obtain finely dispersed composition with carbon black by mechanical mixing of a polymer prepolymerized in the absence of carbon black, with carbon black, and it is obvious that the composition obtained, even if the mixing could be performed, contains no polymer chemically bonded with carbon black particles.

Thus the above limitation for the composition (i) of the subject composition in which at least 5% by weight of the polymer of α,β-ethylenically unsaturated monomer is chemically bonded with the carbon black means that, when the composition (i) is filtered as described in the above, at least 5% by weight of the polymer must remain with the carbon black as the filtration residue even after thorough washing. Therefore, all the mixtures obtained by mechanical blending of carbon black with polymers containing no carbon black, in the optional presence of solvent, are excluded from the scope of the composition (i).

Also the composition (i) excludes such compositions formed by mixing the carbon black with free polymer which was separated from the composition obtained by polymerization of the monomer in the presence of carbon black in the invention.

The polymer of α,β-ethylenically unsaturated monomer in the composition (i) is uniformly miscible with the thermosetting, aromatic polyamide resin (ii) in a liquid medium, and substantially decomposes by thermal decomposition or depolymerization at the thermosetting temperature of the latter, i.e., 150–300° C., remaining in no substantial amount in the cured product.

Such a polymer may be a homopolymer or copolymer, of α,β-ethylenically unsaturated monomers which can form polymers of average molecular weight ranging 500–50,000, substantially decomposing at 150–300° C.

As such monomers, for example, monomers represented by the general formula

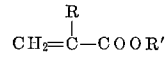

(wherein R is hydrogen atom or methyl group, and R' is hydrogen, hydrocarbon group having 1–16 carbon atoms, or hydroxy-, glycidyl- or N,N-dialkylaminoalkyl-substituted hydrocarbon), for instance, acrylic acid, methacrylic acid, or esters of these acids; acryl or methacryl amide and N-methylol compounds thereof; monomers represented by the general formula $CH_2=CH-O-R''$ (wherein R'' is hydrocarbon group or substituted hydrocarbon group having 1–6 carbon atoms); acrylonitrile; methacrylonitrile; vinyl acetate; styrene and derivatives thereof; N-vinyl pyrrolidone; butadiene and derivatives thereof such as isoprene; vinyl chloride; vinylidene chloride; maleic anhydride; itaconic acid, crotonic acid and esters thereof may be cited. These monomers are preferably added to the polymerization system in an amount sufficient to make the polymer content (inclusive of the polymer bonded to carbon black as well as the free polymer) of the carbon black-polymer of α,β-ethylenically unsaturated monomer composition, 5–95% by weight.

It goes without saying that it is unnecessary to add the entire amount of these monomers prior to initiation of the polymerization, but at first a part thereof may be added and the remaining part may be added later.

In the present invention, as what is usable as material carbon black is any one of channel black, furnace black, acetylene black and lamp black showing reactivity to a free radical and selection thereof is to be decided by use of the resulting dispersion. Of these carbon blacks, what shows remarkable advancement of fluidity is furnace black having a relatively high pH value and high structure. It is preferable to add these carbon blacks to the polymerization system in a sufficient amount so that carbon black content in a carbon black-polymer of α,β-ethylenically unsaturated monomer composition may become 5–95% by weight, especially 50–95% by weight.

As a free radical polymerization initiator, azo compounds especially azobisnitriles such as 2,2'-azobisisobutyronitrile, 2,2'-azobispropionitrile and 2,2'-azobisvaleronitrile; and peroxides such as benzoyl peroxide, cumene hydroperoxide, t-butylhydroperoxide and di-t-butylperoxide are usable.

In the present invention, of the aforementioned initiators, it is especially preferable to use azobisnitriles, while an organic peroxide is also usable, though in some cases carbon black shows inhibition of polymerization on the contrary, being not preferable.

It is preferable to use the aforementioned initiators in an amount of 0.1–10% by weight based on the amount of monomers in order to eliminate inhibition or retardation of polymerization by carbon black and then to complete the polymerization. The polymerization may be carried out by bulk polymerization, solution polymerization or suspension polymerization in an inert atmosphere at a temperature of 20–150° C. The inert atmosphere can easily be attained by degassing the reaction vessel or filling the reaction vessel with an inert gas such as nitrogen. A preferable polymerization temperature varies depending upon kinds of initiator and monomer used. However, generally it is within the range of 50–90° C. The polymerization may be carried out in the optional presence of a solvent, however, generally it is preferable to use an inert solvent which can dissolve the initiator, the monomer used and the produced free polymer. Also a solvent which is compatible with the thermosetting, aromatic polyamide resin dissolved in a liquid medium of (ii) is advantageously used. The solvent used varies depending upon kinds of monomer and intitiator, however, it may be properly selected from solvents consisting of ketones such as acetone, methylethyl ketone and methyl isobutyl ketone; alcohols such as methanol, ethanol, isopropanol and n-butanol; N,N-dialkylcarboamides such as N,N-dimethylformamide and N,N-dimethylacetamide; ethers such as dioxane, ethylene glycol monomethyl ether, ethylene glycol monoethyl ether, ethylene glycol monobutyl ether; and hydrocarbons such as benzene, toluene, xylene, cyclohexane and heptane.

In case of free radical polymerization of α,β-ethylenically unsaturated monomers in the presence of a relatively large amount of carbon black, the molecular weight of the produced polymer becomes considerably low as compared with a case wherein α,β-ethylenically unsaturated monomer alone is polymerized, however, it is possible to concurrently use a chain transfer agent like dodecyl mercaptan to control the molecular weight.

In the preparation of carbon black-polymer of α,β-ethylenically unsaturated monomer composition by polymerization, the total amount of free radical polymerization initiator may be added to the system at the beginning of the reaction or it may be added dividedly by plural portions.

In the latter case, at least one α,β-ethylenically unsaturated monomer, carbon black, and optionally a solvent, are caused to be present in the polymerization system, and to which $1/10-3/4$ of the total amount of an initiator is added.

Prior to the initiation of polymerization, the system is in the form of a wet mass and almost impossible of being stirred. The reaction mixture, however, approximately 30 minutes to 5 hours, more particularly 30 minutes to 3 hours, after initiation of the reaction, abruptly attains fluidity. Conversion of this state is generally in the order of 1–50%.

Thereafter the rest of the initiator is added to the polymerization system in 1–5 divided portions. Thus more than 90%, for example, above 98%, of the monomer can be converted to the corresponding polymer.

Addition of the initiator in at least two divided portions as described in the above, i.e. adding a portion thereof prior to the initiation of polymerization and the rest after the fluidity of the reaction mixture increased, is useful to increase the conversion of the monomeric component to the polymer. Thus the unreacted monomer does not exist in the system by the almost complete conversion, and simultaneously the chain structures of carbon black are partially destroyed. The resultant carbon black-polymer of α,β-ethylenically unsaturated monomer composition exhibits excellent fluidity and stability.

The carbon black-polymer of α,β-ethylenically unsaturated monomer composition used in the invention shows good dispersibility in a high solid resin and carbon black contents where concentration of the non-volatile portion is above 30% by weight, carbon black content in the non-volatile portion is 5–95%, preferably 50%–95% by weight, either completely failing to show thixotropy or even if showing thixotropy it is by a minor extent as compared with that of what is obtained by mixing carbon black per se by mechanical dispersion in a polymer solution.

Various kinds of known thermosetting aromatic polyamide resins are usable as the other component of the electroconductive composition of the present invention. As such known resins there are cited polyamide acid resins disclosed in British Pat. 935,388 and Japanese Pat. 299,375 and represented by the Formula I:

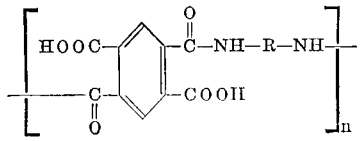

(I)

polyamide acid resins disclosed in C. & E. News, vol. 43, Apr. 26, 1965, p. 49 and represented by the Formula III:

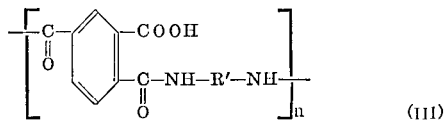

(III)

polyamide amino resins disclosed in Makromol. Chem., vol. 77, 41 (1964) and J. Polymer Sci., vol. 50, 417 (1961) and represented by the Formulas V and VII:

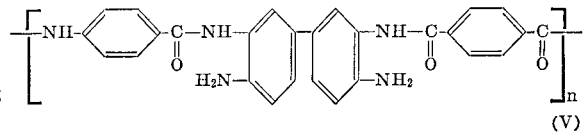

(V)

and

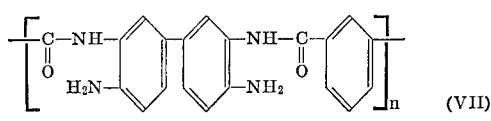

(VII)

and polyhydrazide resins disclosed in J. Polymer Sci., Part A, vol. 2, 1137; 1147; 1825 (1964) and represented by the Formula IX:

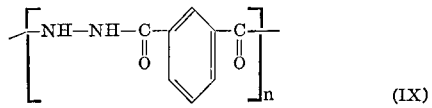

(IX)

The aromatic polyamide resin of the present invention includes the above mentioned thermosetting resins. These resins represented by the above Formulas I, III, V, VII and IX are converted by heating to cured resins, i.e., polyimide resin, polyimide amide resin, polyimidazole amide resin, polyimidazole resin and polyoxadiazole resin, represented by the following Formulas II, IV, VI, VIII and X, respectively:

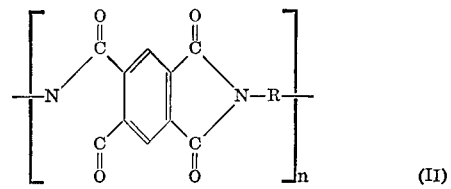

(II)

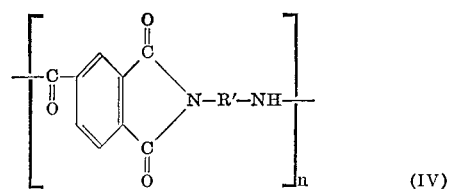

(IV)

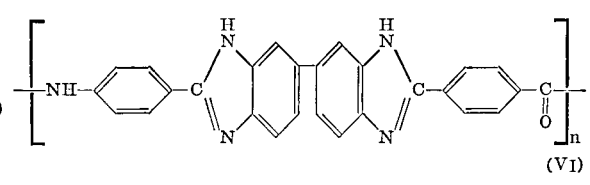

(VI)

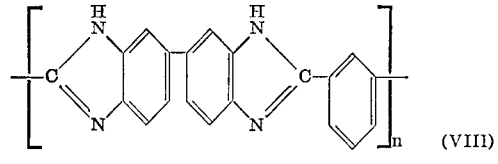

(VIII)

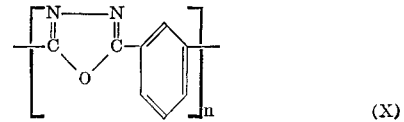

(X)

For instance, in case R is phenyl in the Formula I, the polyamide resin is called Pyre-ML (product of Du Pont, U.S.A.), and in case R' is phenyl in the Formula III, the polyamide resin is called AI Polymer (product of Amoco Chemicals Corp., U.S.A.).

Such thermosetting polyamide resins to be used in the present invention are cured at 150–300° C., usually 200–250° C. to form thermoset heat resisting products which can resist instantaneously to temperatures of 600° C. or higher. Among the cure reactions of the above mentioned polyamide resins, the cure reaction of the polyamide acid (I) or (III) where the imide ring is formed from the carboxyl and imino groups can be conducted easier as compared with the case of the cure reaction of the polyamide amino resin (V) or (VII) where the diazole ring is formed from the carbonyl and amino groups or the case of the cure reaction of the polyhydrazide (IX) where the oxadiazole ring is formed from the hydrazide and carbonyl groups. Accordingly, use of polyamide acid resins (I) and (III) as the thermosetting aromatic resin is recommended in the practice of the present invention.

In the present invention, these polyamide acid resins are dissolved in liquid medium. Known solvents can be used as the liquid medium, e.g., such as N-methylpyrrolidone, pyridine, N,N-dimethylformamide, N,N-dimethylacetamide, dimethylsulfoxide, etc., can be used either singly or as mixtures.

Also as the diluent which cannot be used by itself but may be co-used with the above solvent, methyl isobutyl ketone, cyclohexanone, isopropanol, n-butanol, ethylene glycol monomethylether, ethylene glycol monobutylether, toluene, xylene, etc. can be named.

The electroconductive composition of the present invention consists of (i) carbon black-polymer of $\alpha,\beta$-ethylenically unsaturated monomer composition as already described, and (ii) the solution of thermosetting, aromatic polyamide resin in the above liquid medium.

In the electroconductive composition, the content of carbon black-polymer of $\alpha,\beta$-ethylenically unsaturated monomer is 2–50% by weight, that of the thermosetting, aromatic polyamide resin solution in the liquid medium is 50–98% by weight, that of carbon black is 5–95%, preferably 50–95% by weight in the said (i) composition and that of the non-volatile component is 5–50%, preferably 10–40% by weight in the said electroconductive composition.

When the electroconductive liquid composition of the invention is formed into, for example, film by casting, or impregnated in suitable supporting substrate, such as fabrics like glass cloth, or asbestos, paper, etc., or daubed onto such supporting substrate in the form of film, and heated to 150–300° C., preferably 200–250° C., the polyamide resin therein is cured to form polyimide, polyimidazole or polyoxadiazole resin layer. Simultaneously, in the carbon black-polymer of $\alpha,\beta$-ethylenically unsaturated monomer composition, the polymer other than the carbon black is depolymerized or thermally decomposed. The remaining carbon black is uniformly dispersed in the cured resin film. Thus a resistor or heating element can be formed.

When parallel electrode is attached to thus obtained resistor or heating element, the same can be used as resistor film or heating element. The time variation of surface resistivity, particularly that under high temperature, is extremely low. Thus articles of widely varied surface resistivities from $$10\Omega_\square - 10^{10}\Omega_\square$$

can be optionally prepared.

The electroconductive composition obtained in accordance with the invention and which is composed of polyamide resin containing carbon black as uniformly dispersed therein, exhibits the following advantages: (1) because the carbon black is dispersed in the polyamide resin through the polymer chemically bonded with the carbon black, the carbon black dispersion is very uniform, and the dispersibility is stable, unlike the case of simple mixing carbon black into the resin by mechanical means; (2) because polyimide, polyimidazole or polyoxadiazole resin is rendered usable as the resin base, the heating elements prepared from the composition can be used for a long period without sign of deterioration at approximately 200° C., such having been inachievable by the conventional art; and (3) because the decomposition temperature of polyimide, polyimidazole or polyoxadiazole resin is sufficiently higher than that of polymer of $\alpha,\beta$-ethylenically unsaturated monomer (150–300° C.), it is possible to form polyimide, polyimidazole or polyoxadiazole resin layer and decompose polymer of $\alpha,\beta$-ethylenically unsaturated monomer simultaneously with cure of the polyamide resin, while the presence of residual polymer of $\alpha,\beta$-ethylenically unsaturated monomer in the heating element is objectionable since such is detrimental to the stability of electrical resistivity.

For example, when epoxy resin is used as a heat resisting resin, it is simultaneously decomposed with the decomposition of polymer of $\alpha,\beta$-ethylenically unsaturated monomer. As the result the coating of the cured electroconductive composition is cracked, and carbon black particles are directly exposed to the air, to be easily affected by moisture in the air. The coating also is apt to be broken by external force. Heating elements prepared from the composition cannot withstand the regular use at above 100° C.

In contrast thereto, the heating elements prepared from the composition of the invention exhibit time variation of surface resistivity of within −10% during the continuous use for 3,000 hours at 200° C.

Hereinafter the invention will be explained with reference to working examples, which are given strictly for illustrative purpose, but in no sense are limitative of the scope of this invention.

TEST METHOD

The following test method is applied to the test in Example 19 and is somewhat modified, if necessary, in other examples.

The maximum life under continuous use of heating element at high temperature, and the time variation of electrical resistivity mentioned in the examples were determined as follows.

TEST SAMPLE

A piece of glass fiber fabric (plain cloth, 0.1 mm. thick, 93.4 g./m.$^2$, 21.3×19 picks/cm.) which was 0.1 mm. thick, 30 cm. long and 32 cm. wide was impregnated with an electroconductive liquid composition, and the sample was heat-treated for an hour to cure the thermosetting resin in the composition. The pick-up of the composition was 35 g./m.$^2$ after curing. The glass fiber fabric thus coated with the cured composition was used as the test piece.

High temperature resistivity variation test

At the both ends of 32 cm. width of the sample fabric two parallel electrodes of 1 cm. width were attached at both edges along the length of the sample by spraying a molten zinc metal. Lead wires were fixed with clips to each of the electrodes. Thereafter, the sample fabric was placed in an air-bath a temperature of which was constantly maintained at 200° C. In the circuit the specific electrical resistivity $$(\Omega_\square)$$

was measured by means of an ohmmeter. The initial value of the specific electrical resistivity at 200° C. (A) and the value after 3000 hours' heating (B) were actually measured, and the time variation of electrical resistivity was calculated by the following formula:

Time variation of electrical resistivity (%)

$$= \frac{A-B}{A} \times 100$$

Test for durability to continuous use at high temperature

The variation of the electrical resistivity measured in accordance with the above mentioned measuring method was automatically registered, and the value of durability to continuous use at high temperatures of the sample was defined by the time in which the resistivity stayed within the range of +10% of the minimum to the minimum.

REFERENTIAL EXAMPLES

Preparation of Carbon Black-Polymer of α,β-Ethylenically Unsaturated Monomer Composition.

Example 1

A reaction vessel equipped with a stirrer was charged with 100 parts of furnace black (GPF grade: oil absorption: 160 cc./100 g., pH: 8.0, iodine adsorption: 29 mg./g.), 100 parts of n-butyl acrylate, 200 parts of ethylene glycol monoethylether and 0.5 part of 2,2'-azobisisobutyronitrile. The air inside the vessel was sufficiently replaced by nitrogen, thereafter the contents were gradually stirred and heated to 75° C. to initiate polymerization. Such way, after 2 hours conversion became 5%, structural viscosity of the reaction mixture extremely lowered and fluidity increased, at this point further 0.6 part of 2,2'-azobisisobutyronitrile was added and after 3 hours, the conversion became 20%, where further 1 part of the initiator was added and after 3 hours, the conversion became 77%, further 1 part of the initiator was added and after 2 hours, the conversion became 98.5%. When the average molecular weight of the resin component in the obtained composition was determined by vapor pressure osmometer, it was 7,600 whereby it was conferred that 7% of the entire resin bonded to the carbon black.

On account of high carbon black content, the mixture before initiation of the reaction was a wet mass and stirring was almost impossible. However, within 2 hours after the initiation of the reaction the mixture abruptly came to have fluidity and thereafter stirring became smooth.

The dispersion stability of the so obtained composition was far more excellent than that of the comparative sample and even said composition was subjected to a centrifugal separator at a speed of 16,000 r.p.m. for 1 hour, it was not possible to completely precipitate the dispersoid, while on the other hand, the comparative sample completely precipitated under much milder condition to give a colorless transparent supernatant liquid.

Example 2

A reaction vessel equipped with a stirrer was charged with 100 parts of furnace black (APF grade: oil absorption: 168 cc./100 g., pH: 7.8, iodine adsorption amount: 30 mg./g.), 8 parts of n-butyl methacrylate, 2 parts of methacrylic acid, 160 parts of ethylene glycol monomethylether and 0.4 part of 2,2'-azobisisobutyronitrile and polymerization reaction was initiated at 85° C. in nitrogen atmosphere with slow stirring. Four hours after initiation of the reaction, conversion became 42%, where further 0.6 part of 2,2'-azobisisobutyronitrile was added and the reaction was made to proceed and 5 hours after the conversion could be made 98%. Change of fluidity of the reaction mixture was about same as that in Example 1.

The molecular weight of the free polymer according to vapor pressure osmometer was 6,000.

Example 3

A reaction vessel equipped with a stirrer whose internal atmosphere was replaced by nitrogen was charged with 100 parts of furnace black (HAF grade: oil absorption: 145 cc./100 g., pH: 8.5, iodine adsorption: 96 mg./g.), 100 parts of distilled and purified styrene, 200 parts of toluene and 0.5 part of 2,2'-azobisisobutyronitrile, and the contents were reacted at 80° C. for 3 hours. Within 2 hours after the initiation of the reaction dispersion of the reaction mixture remarkably changed and came to show fluidity. However, with combination of this monomer with the initiator, increase in conversion was slow and the conversion at the first stage was 12%, where further 0.5 part of the initiator was added and 3 hours after the conversion was made 41%, where still further 0.5 part of the initiator was added and 10 hours after initiation of the reaction, the conversion became 75%, where the reaction temperature was raised to 100° C. and by carrying out the reaction for 18 hours, the polymerization was nearly completed and it was possible to make the conversion 98%.

Example 4

A reaction vessel equipped with a stirrer filled with nitrogen was charged with 100 parts of channel black (MCC grade: oil absorption: 110 cc./100 g., pH: 4.5), 200 parts of methyl methacrylate and 0.5 part of 2,2'-azobisisobutyronitrile, and the resultant slurry was reacted at 60–70° C. with slow stirring. Within 2 hours after the initiation of polymerization, the reaction mixture became a liquid dispersion, where the temperature of the reaction mixture was cooled to room temperature. Another similar reaction vessel was charged with 1000 parts of water to which 2.2 parts of a 20% poly(potassium methacrylate) and 10 parts of sodium phosphate were added as dispersing agent and well dissolved therein. Thereafter, the aqueous solution was well stirred, to which said carbon black mixture further added with 0.5 part of the initiator was added and dispersed therein, the resultant mixture was reacted at 70° C. for 5 hours with stirring and at 85° C. for 1 hour, the obtained granular composition was separated by filtration and washed with water. The so obtained wet granular solid composition was soluble in a solvent dissolving poly(methyl methacrylate), for instance, benzene and formed a stable dispersion. This composition dissolved in methyl isobutyl ketone so that the solid component might become 50%, showed fluidity close to Newtonian flow.

Example 5

The liquid polymerization mixture containing carbon black at the first stage in Example 4 was further added with 0.5 part of 2,2'-azobisisobutyronitrile, the resultant mixture was poured into a cell consisting of 2 sheets of reinforced glass and spacers, the air was excluded and the cell was sealed, said cell was placed inside a constant temperature water bath, the contents were polymerized at 70° C. for 10 hours, and at 95° C. for 1 hour, left to stand to cool, thereafter taken out from the cell. The so obtained product can be pulverized into wet chips. The properties to the solvent, dispersing stability and fluidity of the solvent dispersion were same as in Example 4.

Example 6

In this example, a case of using N,N-diethylaminoethyl methacrylate will be explained.

A reaction vessel equipped with a stirrer was replaced of its internal atmosphere with nitrogen and charged with 100 parts of furnace black (GPF grade: oil absorption: 160 cc./100 g., pH: 8,9, iodine adsorption: 29 mg./g.), 100 parts of N,N-diethylaminoethyl methacrylate, 200 parts of methyl isobutyl ketone as solvent and 1 part of 2,2'-azobisisobutyronitrile, the contents were polymerized at 80° C. for 3 hours and when conversion became 75%, further 1 part of 2,2'-azobisisobutyronitrile was added and the resultant mixture was reacted for 3 hours to make the conversion 98%. In this case, comparison and examination with a sample obtained by mechanical mixing were carried out by using a concentric rotary cylinder type viscometer, and in both cases dilatancy was shown, and especially that of the reaction product was remarkable. However, when stability when being left to stand was examined, it was understood that the mechanical mixture was far inferior to the polymerization product.

Example 7

A reaction vessel equipped with a stirrer whose internal atmosphere was replaced by nitrogen was charged with 200 parts of furnace black (APF grade: oil absorption: 168 cc./100 g., pH: 7.8, iodine adsorption: 30 mg./g.), 140 parts of n-butyl acrylate, 30 parts of N,N-diethylaminoethyl methacrylate, 30 parts of acrylamide, 360 parts of methyl isobutyl ketone, 40 parts of n-butyl alcohol and 0.6 part of 2,2′-azobisisobutyronitrile, the contents were polymerized at 80° C. for 3 hours, further 2 parts of 2,2′-azobisisobutyronitrile were added, and the resultant mixture was polymerized for 2 hours to complete the polymerization. The obtained carbon black composition has good fluidity and excellent dispersion stability and even when treated by a centrifuge at 16,000 r.p.m. for 1 hour it was impossible to completely precipitate the composition. For the purpose of comparison, an interpolymer obtained from said monomers was separately synthesized, in a solution of which the same carbon black was mechanically dispersed, and stability of the obtained mixture was examined. The same centrifuge was used and when rotation reached 16,000 r.p.m. the switch was turned off. After the stop of said separator, when the mixture was taken out, it was completely precipitated and separated.

Example 8

The product of Example 7 was added with 63 parts of n-butanol solution of formaldehyde (formaldehyde: 40%) and 0.5 part of maleic anhydride, the mixture was reacted for 3 hours under reflux with a water separator provided and the water formed was taken out of the mixture as an azeotrope. The so obtained composition into which N-methylol group was introduced was excellent in dispersion stability as in Example 7.

Example 9

A reaction vessel equipped with a stirrer whose internal atmosphere was replaced by nitrogen was charged with 100 parts of furnace black (APF grade: oil absorption: 168 cc./100 g., pH: 7.8, iodine adsorption: 30 mg./g.), 20 parts of n-butyl acrylate, 5 parts of acrylic acid, 160 parts of ethylene glycol monomethylether and 0.3 part of 2,2′-azobisisobutyronitrile, and the contents were reacted at 80° C. with mild stirring. Two hours after the initiation of polymerization, fluidity of the mixture increased, facilitating the stirring. Four hours after initiation of the polymerization, 0.4 part of 2,2′-azobisisobutyronitrile was added, further 2 hours after that, 0.4 part of 2,2′-azobisisobutyronitrile was added, namely, the polymerization was carried out for total 8 hours to make the conversion 99.5%.

Example 10

One hundred parts of furnace black (oil absorption: 17 cc./g.) was added to a mixture consisting of 8 parts of n-butyl acrylate, 2 parts of acrylic acid, and 192 parts of N,N-dimethylformamide, and further 0.5 part of 2,2′-azobisisobutyronitrile was added to the mixture. The reaction was carried out at 85° C. for 3 hours, and thereafter again 0.5 part of 2,2′-azobisisobutyronitrile was added to the mixture, followed by additional 3 hours of the reaction. Thus a carbon black-polymer of α,β-ethylenically unsaturated monomer composition was obtained.

Example 11

To a mixture consisting of 100 parts of furnace black (oil absorption: 16 cc./g.), 10 parts of N,N-diethylaminoethyl methacrylate, 10 parts of n-butyl acrylate, and 200 parts of N,N-dimethylformamide, 1.0 part of 2,2′-azobisisobutyronitrile was added in nitrogen stream, and the mixture was reacted at 75° C. for 8 hours. Thus a carbon black-polymer of α,β-ethylenically unsaturated monomer composition was obtained. The conversion of the α,β-ethylenically unsaturated monomer was 86%.

Example 12

To a mixture consisting of 100 parts of furnace black (oil absorption: 16 cc./g.), 5 parts of N,N-diethylaminoethyl methacrylate, 5 parts of n-butyl methacrylate and 192 parts of N,N-dimethylformamide, was added 0.5 part of 2,2′-azobisisobutyronitrile under nitrogen atmosphere. The reaction was carried out for 3 hours at 85° C., following which 0.5 part of 2,2′-azobisisobutyronitrile was further added to the reaction mixture and the reaction was continued for 3 hours to obtain a carbon black-polymer of α,β-ethylenically unsaturated monomer composition.

WORKING EXAMPLES.—COMPOSITIONS OF THE INVENTION

Example 13

Each 130, 80, 130 and 100 parts, respectively, of the carbon black-polymer of α,β-ethylenically unsaturated monomer compositions obtained in the foregoing Examples 1, 2, 3 and 10, was mixed with 108 parts of a varnish (solid content: 43%) of an aromatic polyamide acid resin (trade name: AI Polymer, product of Amoco Chemicals Corp., U.S.A.) and 205 parts of a solvent of the varnish (N-methylpyrrolidone 3: dimethylacetamide 1). Each resultant liquid mixture was impregnated in glass fiber fabric, and heated for 15 minutes at 250° C. Thus an electroconductive sheet with surface resistivity of approximately $$260\Omega_\square$$

was obtained, respectively, which was subsequently converted to a sheet heating element by attaching parallel electrodes thereto. The element exhibited time variation of surface resistivity of within ±10%, throughout the continuous use for 3,000 hours at 200° C.

Example 14

Each 130, 130, 95 and 100 parts, respectively, of the compositions obtained in Examples 6, 7, 9 and 10, were mixed with 290 parts of a varnish (solid content: 16%, solvent: N,N-dimethylacetamide) of an aromatic polyamide acid resin (trade name: Pyre-ML, product of Du Pont Co., U.S.A.) and 160 parts of a diluent of the varnish (N-methylpyrrolidone 6: N,N-dimethylacetamide 3: toluene 4). The resultant mixture was impregnated in glass fiber fabric, and heated at 300° C. for 10 minutes, to provide an electroconductive sheet with surface resistivity of $$120\Omega_\square$$

respectively. The sheet was attached wtih parallel electrode, and used as sheet heating element. The time variation of surface resistivity of the element throughout the 3,000 hours of continuous use at 200° C. was within ±5%.

Example 15

Each 100 and 200 parts, respectively, of the compositions obtained in Examples 10 and 4 (solid content: 50%, solvent: methyl isobutyl ketone) was mixed with 108 parts of a varnish (solid content: 30%, solvent: N,N-dimethylformamide-N-methylol pyrrolidone (1:1)) of an aromatic polyamide acid resin (trade name: AI Polymer) and 620 parts of the solvent of identical composition with that used in Example 13.

The mixture was sprayed on the surface of substrates such as glass sheet, porcelain plate or cylinder and air-dried, followed by heating at 250° C. for 30 minutes Thus resistor with surface resistivity of approximately $$300\ \Omega_\square$$

was obtained respectively. Similar resistors could be prepared by daubing the composition with a brush onto the substrates. Attaching parallel electrodes, each resistor was used as a heating element, exhibiting time variation of surface resistivity for 3,000 hours at 200° C. of within ±10%.

Example 16

Each 100 and 180 parts, respectively, of the compositions obtained in Example 11 and by dissolving the wet chips produced in Example 5 into ethylene glycol monoethylether, to a solid content of 50%, was mixed with 108 parts of a varnish (solid content: 43%, solvent: pyridine-N-methylpyrrolidone (1:1)) of an aromatic polyamide acid resin (trade name: AI Polymer) and 205 parts of the solvent identical with that used in Example 13.

The mixture was impregnated in glass fiber fabric and heated at 250° C. for 30 minutes, whereby providing an electroconductive sheet. The product had a surface resistivity of $$250 \ \Omega\square$$

respectively, and the time variation of surface resistivity for 3,000 hours at 200° C. with within ±10%.

Example 17

A piece of kraft paper was immersed in an equivalent solution of a varnish (solid content: 43%, solvent: N,N-dimethylacetamide) of an aromatic polyamide acid resin (trade name: AI Polymer) in the solvent of the varnish (N-methylpyrrolidone 3: N,N-dimethylacetamide 1), and heated at 200° C. for 15 minutes. Thus the entire surface of the kraft paper was coated with the polyimide resin film. The so coated paper was further immersed in a liquid mixture consisting of 100 parts of the composition obtained in Example 10, 108 parts of the same polyamide acid resin varnish as above-mentioned (solid content: 43%, solvent: N,N-dimethylacetamide), and 205 parts of a solvent of the varnish (N-methylpyrrolidone 3: N,N-dimethylacetamide 1), and heated at 200° C. for 30 minutes. Thus a sheet resistor having a surface resistivity of $$250 \ \Omega\square$$

was obtained. The product was suited for the use as sheet heating element, resistor, etc., and showed the time variation of surface resistivity of ±5%, during the continuous heating for 3,000 hours at 150° C.

Example 18

A piece of glass fiber was immersed in a liquid mixture consisting of each 100 and 130 parts, respectively, of the compositions obtained in Examples 11 and 8, 700 parts of varnish (solid content: 43%, solvent: N,N-dimethylformamide) of an aromatic polyamide acid resin (trade name: AI Polymer), and 4,200 parts of a solvent of the varnish (identical with that used in Example 13), and heated at 250° C. for 30 minutes. Thus a sheet resistor having a surface resistivity of $$10^8 \ \Omega\square$$

was obtained, respectively. When the product was used as a sheet resistor or for prevention of static charge, its time variation of surface resistivity was very minor.

Example 19

Samples were prepared in accordance with the above mentioned sample-preparing method. As the carbon black-polymer of $\alpha,\beta$-ethylenically unsaturated monomer composition, there was used each 100 parts of the composition (A) prepared in Example 10 and the composition (B) prepared in Example 12, respectively. As the aromatic polyamide resin, the polyamide amino resin (V) or (VII) or the polyhydrazide resin (IX) was used. The glass fiber fabric was immersed into the mixture of 100 parts of the composition (A) or (B), 108 parts of the varnish (solid content: 40%) of the aromatic polyamide resin in N,N-dimethylformamide and 150 parts of a solvent of the varnish (N-methylpyrrolidone 3: N-N-dimethylacetamide 1). The time variation of surface resistivity was measured in accordance with the above mentioned testing method in respect of each sample. The results are shown in Table 1 below.

TABLE 1

| Carbon black-polymer of $\alpha,\beta$-ethylenically unsaturated monomer composition (parts) | Thermo-setting aromatic polyamide resin (parts) | Surface resistivity of electro-conductive sheet ($\Omega\square$) | Time variation of surface resistivity (percent) |
|---|---|---|---|
| A (100) | V (108) | 130 | Within ±10. |
| A (100) | VII (108) | 140 | Do. |
| A (100) | IXj(108) | 120 | Do. |
| B (100) | V (108) | 150 | Do. |
| B (100) | VII (108) | 130 | Do. |
| B (100) | IX (108) | 120 | Do. |

CONTROL

AI Polymer was added to the carbon black-polymer of $\alpha,\beta$-ethylenically unsaturated monomer composition obtained in Example 10 to provide electroconductive composition, in which the carbon black content in the solid component was 40% by weight. Thus obtained electroconductive paint with the heat resisting resin as the base was impregnated in a piece of glass fiber fabric of 0.1 mm. in thickness, to a pick-up of 35 g./m.². The solvent employed was N,N-dimethylformamide, and the heat treatment was performed at 250° C. for an hour. Thus obtained electroconductive sample was numbered as sample 1.

Also to the identical carbon black-polymer of $\alpha,\beta$-ethylenically unsaturated monomer composition, Epikote 815 (trade name: product of Shell International Chemicals Corp., England) was added in an amount to render the carbon black content in the solid component of the composition 30%. Thus obtained electroconductive paint was similarly impregnated in 0.1 mm. thick glass fiber fabric, to a pick-up after baking of 32 g./m.². The baking treatment was performed at 200° C. for 1.5 hours. The resultant sample was numbered as sample 2.

The above resistors (sample Nos. 1 and 2) both exhibited surface resistivity reduction with time passage when treated at high temperature. After the respective minimum values were reached, the resistivity started to rise due to the breakage of the electroconductive coating. Since such resistivity variation is reduced within approximately +10% of minimum value, temporarily the resistivity variation range of +10%~ minimum value ~+10% was measured as the practical value, and the life of any specific resistor was estimated based on the measured result.

Also since the life expectancy would be over a long period (several years) if measured at normally employed temperatures, the measurement was performed at high temperatures (415° C., 445° C.) in order to enforce the comparison in shorter period. The results were as follows:

| | 415° C. (min.) | 445° C. (min.) |
|---|---|---|
| Sample: | | |
| 1 | 102 | 90 |
| 2 | 24 | 9 |

Thus the superiority of sample 1 to sample 2 is conspicuous, and the difference will be much greater if the life expectancy is measured at 200° C.

Furthermore, the above results also clearly indicate that the time variation of surface resistivity within the range of +10%~0~+10% is far less with the sample 1. Thus it can be understood that at the practical temperature of 200° C., the resistivity variation is almost negligible over prolonged period, as indicated in the foregoing examples.

What is claimed is:
1. An electroconductive composition which contains dispersed therein carbon black and at least one synthetic resin in a liquid medium comprising:
(i) a carbon black polymer containing 5 to 95% by weight carbon black, at least 5% of which is chemically bonded to said polymer, which polymer is comprised of monomers and comonomers selected from the group consisting of (a) monomers represented by the formula:

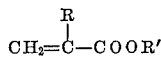

wherein R is selected from the group consisting essentially of hydrogen and a methyl group and R' is selected from the group consisting essentially of hydrogen, hydrocarbon radicals having from 1 to 16 carbon atoms, hydroxy-substituted hydrocarbon radicals having from 1 to 16 carbon atoms, glycidyl-substituted radicals having from 1 to 16 carbon atoms and N,N-dialkylaminoalkyl-substituted hydrocarbon radicals wherein each of said substituted hydrocarbon radicals has from 1 to 16 carbon atoms; (b) monomers represented by the formula:

$$CH_2=CH-O-R''$$

wherein R'' is selected from the group consisting of hydrocarbon radicals having from 1 to 6 carbon atoms and substituted hydrocarbon radicals having from 1 to 6 carbon atoms, acrylonitrile, methacrylonitrile, vinyl acetate, styrene, N-vinyl pyrrolidone, butadiene, vinyl chloride, vinylidene chloride, maleic anhydride, itaconic acid, crotonic acid and esters thereof, acrylamide, methacrylamide and N-methylolated products thereof, said carbon black-polymer having an average molecular weight ranging from 500 to 50,000 and substantially decomposing it from 150° C. to 300° C.;
(ii) a thermosetting, aromatic polyamide resin which is dissolved in a liquid medium, said electroconductive composition containing 2 to 50% by weight of said carbon black-polymer and 50 to 98% by weight of said thermosetting, aromatic polyamide resin solution and 5 to 50% by weight of a non-volatile component.

2. A process for preparing an electroconductive resistor or heating element in the form of a film which comprises casting a film of an electroconductive composition comprising:
(i) a carbon black polymer containing 5 to 95% by weight carbon black, at least 5% of which is chemically bonded to said polymer, which polymer is comprised of monomers and comonomers selected from the group consisting of (a) monomers represented by the formula:

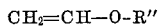

wherein R is selected from the group consisting essentially of hydrogen and a methyl group and R' is selected from the group consisting essentially of hydrogen, hydrocarbon radicals having from 1 to 16 carbon atoms, hydroxy-substituted hydrocarbon radicals having from 1 to 16 carbon atoms, glycidyl-substituted radicals having from 1 to 16 carbon atoms and N,N-dialkylaminoalkyl-substituted hydrocarbon radicals wherein each of said substituted hydrocarbon radicals has from 1 to 16 carbon atoms; (b) monomers represented by the formula:

$$CH_2=CH-O-R''$$

wherein R'' is selected from the group consisting of hydrocarbon radicals having from 1 to 6 carbon atoms and substituted hydrocarbon radicals having from 1 to 6 carbon atoms, acrylonitrile, methacrylonitrile, vinyl acetate, styrene, N-vinyl pyrrolidone, butadiene, vinyl chloride, vinylidene chloride, maleic anhydride, itaconic acid, crotonic acid and esters thereof, acrylamide, methacrylamide and N-methylolated products thereof, said carbon black-polymer having an average molecular weight ranging from 500 to 50,000 and substantially decomposing it from 150° C. to 300° C.;
(ii) a thermosetting, aromatic polyamide resin which is dissolved in a liquid medium, said electroconductive composition containing 2 to 50% by weight of said carbon black-polymer and 50 to 98% by weight of said thermosetting, aromatic polyamide resin solution and 5 to 50% by weight of a non-volatile component;

and heating the resulting film until said carbon black-polymer is de-polymerized.

3. A process for preparing an electroconductive element which comprises coating a substrate with an electroconductive composition comprising:
(i) a carbon black polymer containing 5 to 95% by weight carbon black, at least 5% of which is chemically bonded to said polymer, which polymer is comprised of monomers and comonomers selected from the group consisting of (a) monomers represented by the formula:

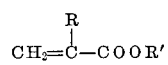

wherein R is selected from the group consisting essentially of hydrogen and a methyl group and R' is selected from the group consisting essentially of hydrogen, hydrocarbon radicals having from 1 to 16 carbon atoms, hydroxy-substituted hydrocarbon radicals having from 1 to 16 carbon atoms, glycidyl-substituted radicals having from 1 to 16 carbon atoms and N,N-dialkylaminoalkyl-substituted hydrocarbon radicals wherein each of said substituted hydrocarbon radicals has from 1 to 16 carbon atoms; (b) monomers represented by the formula:

$$CH_2=CH-O-R''$$

wherein R'' is selected from the group consisting of hydrocarbon radicals having from 1 to 6 carbon atoms and substituted hydrocarbon radicals having from 1 to 6 carbon atoms, acrylonitrile, methacrylonitrile, vinyl acetate, styrene, N-vinyl pyrrolidone, butadiene, vinyl chloride, vinylidene chloride, maleic anhydride, itaconic acid, crotonic acid and esters thereof, acrylamide, methacrylamide and N-methylolated products thereof, said carbon black-polymer having an average molecular weight ranging from 500 to 50,000 and substantially decomposing it from 150° C. to 300° C.;
(ii) a thermosetting, aromatic polyamide resin which is dissolved in a liquid medium, said electroconducting composition containing 2 to 50% by weight of said thermosetting, aromatic polyamide resin solution and 5 to 50% by weight of a non-volatile component; and subsequently, heating the resulting coated substrate until said carbon black-copolymer is depolymerized.

References Cited
UNITED STATES PATENTS

| | | | | |
|---|---|---|---|---|
| 3,243,478 | 3/1966 | Seelig | | 260—857 |
| 3,346,535 | 10/1967 | Dekking | | 260—41 |
| 3,375,219 | 3/1968 | Robb | | 260—41 |
| 3,472,916 | 10/1969 | Anspon et al. | | 260—857 |

DOUGLAS J. DRUMMOND, Primary Examiner

U.S. Cl. X.R.

117—226; 260—41, 857